United States Patent
Genc et al.

(10) Patent No.: US 9,245,375 B2
(45) Date of Patent: Jan. 26, 2016

(54) ACTIVE LIGHTING FOR STEREO RECONSTRUCTION OF EDGES

(75) Inventors: Yakup Genc, Dayton, NJ (US); Gang Li, Princeton, NJ (US); Sajjad Hussain Baloch, Monmouth Junction, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 423 days.

(21) Appl. No.: 13/817,283

(22) PCT Filed: Sep. 13, 2011

(86) PCT No.: PCT/US2011/051342
§ 371 (c)(1),
(2), (4) Date: Jul. 1, 2013

(87) PCT Pub. No.: WO2012/037085
PCT Pub. Date: Mar. 22, 2012

(65) Prior Publication Data
US 2013/0287293 A1    Oct. 31, 2013

Related U.S. Application Data

(60) Provisional application No. 61/383,455, filed on Sep. 16, 2010.

(51) Int. Cl.
  *G06T 7/00* (2006.01)
  *G06T 15/50* (2011.01)
(52) U.S. Cl.
  CPC .............. *G06T 15/50* (2013.01); *G06T 7/0075* (2013.01); *G06T 2207/10012* (2013.01); *G06T 2207/10152* (2013.01); *G06T 2207/20221* (2013.01); *G06T 2207/30164* (2013.01)

(58) Field of Classification Search
  CPC ... G06T 7/0051; G06T 7/0053; G06T 7/0065; G06T 7/0073; G06T 7/0075; G06T 7/0079; G06T 7/0085; G06T 7/0097; G06T 2207/10012; G06T 2207/10021; G06T 2207/10152; G06T 2207/20221
  See application file for complete search history.

(56) References Cited

U.S. PATENT DOCUMENTS 6,686,921 B1 * 2/2004 Rushmeier et al. ........... 345/589
2009/0297020 A1 * 12/2009 Beardsley et al. ............ 382/154

OTHER PUBLICATIONS

Multiflash Stereopsis: Depth-Edge-Preserving Stereo With Small Baseline Illumination; Feris, et al. In IEEE Transactions on Pattern Analysis and Machine Intelligence, vol. 30, No. 1, Jan. 2008 (pp. 1-13).
Non-Photorealistic Camera: Depth Edge Detection and Stylized Rendering Using Multi-Flash Imaging; Raskar, et al. In ACM Transactions on Graphics, vol. 23, No. 3, Aug. 1, 2004 (pp. 679-688).
Specular Reflection Reduction With Multi-Flash Imaging; Feris, et al. In Proceedings of the XVII Brazilian Symposium on Computer Graphics and Image Processing, Oct. 17, 2004 (6 Pages).

(Continued)

*Primary Examiner* — Andrew W Johns

(57) ABSTRACT

Active lighting is provided for stereo reconstruction (30) of edges (11) of a Delta-8 bundle. Stereo images of a device with edges (11) are captured (24). The image capture (24) is repeated under different lighting conditions, such as illuminating (22) the edges (11) from different directions. The images from each viewing or capture direction are combined (28). The combined images are used to stereographically reconstruct (30) the edges (11).

21 Claims, 6 Drawing Sheets

(56) References Cited

OTHER PUBLICATIONS

Modeling and Rendering Architecture From Photographs: A Hybrid Geometry- and Image-Based Approach; Debevec, et al. In Computer Graphics Proceedings, Annual Conference Series, Aug. 4, 1996 (pp. 11-20).

Multi-View Edge-Based Stereo by Incorporating Spatial Coherence; Li, et al. In Sixth International Conference on 3-D Digital Imaging and Modeling, Aug. 1, 2007 (8 Pages).

Extraction of the Line Drawing of 3-Dimensional Objects by Sequential Illumination From Several Directions; Shirai, et al. In Pattern Recognition, Pergamon Press. vol. 4, No. 4, Jan. 1, 1972 (pp. 343-351).

Image Segmentation Using Multi-Coloured Active Illumination; Koh, et al. In Journal of Multimedia, vol. 2, No. 6, Nov. 2007 (pp. 1-6).

Vardy T et al "Reverse Engineering of geometric models—An Introduction", Computer Aided Design, Elsevier Publishers BV., Barking GB, vol. 29, No. 4 Apr. 1, 1997. pp. 255-268, XP0040330883, ISSN:0010-4485, DOI 10.1016/S0010-4485.

* cited by examiner

ACTIVE LIGHTING FOR STEREO RECONSTRUCTION OF EDGES

RELATED APPLICATIONS

The present patent document claims the benefit of the filing date under 35 U.S.C. §119(e) of Provisional U.S. Patent Application Ser. No. 61/383,455, filed Sep. 16, 2010, which is hereby incorporated by reference.

BACKGROUND

The present embodiments relate to identification of edges. For example, a Delta-8 bundle is to be sealed. Delta-8 bundles are ceramic holders for fuel cells. The bundle includes a plurality of extruded triangular tubes. One end of the bundle is open (i.e., the tubes are open). A seal is made for the open ends. The open end profile of different Delta-8 bundles may be irregular due to sintering and multiple process heat cycles. Since each bundle may be different, the seals may not be mass produced.

The composite seal is custom machined with near-zero clearance (e.g., 0.001 inches). The custom seal closely matches the irregular profile of each cell. To design the seal, manual measurement with a tool is performed. However, manual measurements may be time consuming, such as taking weeks to measure the open ends, convert the measurements to a computer aided design (CAD) drawing, and manufacture the seal from the CAD drawing. The ceramic is brittle, so manual measurement increases the odds of damaging the Delta-8 bundle to the point of having to discard the Delta-8 bundle.

SUMMARY

In various embodiments, systems, methods and computer readable media are provided for active lighting for stereo reconstruction of structural edges of a device 10. Structural edges are the physical part of the device (e.g., the edges that may or will be in contact with the seal to be built), rather than edges in the image which may be caused by shadow or low verses high contrast in the image. These structural edges may be referred to as "edges" herein. Stereo images of a device 10 with structural edges are captured. The image capture is repeated under different lighting conditions, such as illuminating the edges from different directions. To better isolate structural edges, the images with different lighting from each viewing or capture direction are combined. The combined images are used to stereographically reconstruct the edges.

In a first aspect, a system is provided for active lighting for stereo reconstruction of edges. A plurality of lights is positioned to illuminate the edges differently at different times. At least two cameras are positioned to view the edges from different directions. A processor is configured to receive images from a first of the different directions. Different images from the first direction are of the edges illuminated differently by the lights. The processor is configured to receive images from a second of the different directions. Different images from the second direction are of the edges illuminated differently by the lights. The processor is configured to generate the stereo reconstruction of the edges as a function of the images from the first and second different directions.

In a second aspect, a system is provided for active lighting for stereo reconstruction of edges. At least one light is configured to illuminate a device 10 having the edges. The illumination is from at least two different directions relative to the device 10. At least one camera is configured, through movement or through multiple of the at least one camera, to acquire images from at least two different view points. Different images for each of the different view points are of the edges while illuminated differently by the at least one light. A processor is configured to combine the images from each of the at least two different view points, the images being combined being responsive to the different illuminations, and generate a stereo reconstruction of the edges of the device 10 from the combined images for the at least two different view points.

In a third aspect, a method of active lighting for stereo reconstruction of edges is provided. A first edge image is generated from a first plurality of first component images. Different first component images correspond to different lighting. A second edge image is generated from a second plurality of second component images. Different second component images correspond to the different lighting. The first component images are from a different direction to the edges than the second component images. A processor constructs a map of the edges from the first and second edge images.

Any one or more of the aspects described above may be used alone or in combination. These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EMBODIMENTS

Passive stereo imaging with active lighting is used to detect edges on a device 10. An image acquisition system scans, measures, and/or constructs a two-dimensional (2D) or three-dimensional (3D) map of the edges. In one example, this acquisition system includes an active lighting part (e.g., nine lights) and a passive stereo part (e.g., two cameras). The active lighting illuminates the edges differently at different times. Using this different lighting, structural edges may be captured with fewer ambiguities for stereo reconstruction. The structure edges may be mapped in a few minutes and without contact.

In the embodiments below, an image-based measurement for fuel cell manufacturing is used as an example. A fuel cell Delta-8 bundle open end (see FIG. 1) is imaged for manufacturing the seal. An image acquisition system collects and processes data from cameras. A data analysis system analyses the data and provides a front end graphical user interface to the user allowing final editing and confirmation before the results are sent to a computerized numerical control machine for manufacturing of a seal. The data analysis may use the 2D/3D map of the open end and a set of data analysis algorithms and rules to construct the optimal placement of any manufacturing constraints for the seal.

In other embodiments, structural edges for other devices 10 may be imaged and located. For example, devices 10 of any material with edges having any configuration may be imaged. In other embodiments, the use of the resulting map of structural edges may be other than for seal manufacturing. For example, the map of edges may be used for flaw detection.

Figure 1:
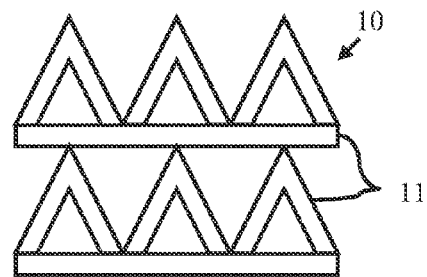
FIG. 1 is an end view of a portion of a Delta-8 bundle, according to one embodiment.

FIG. 1 shows an end view of a portion of a device 10. In the example of FIG. 1, the device 10 is a portion (i.e., six of sixty four cells) of a Delta-8 bundle. Viewed from the open ends, the bundle includes edges 11. The bundle is formed out of plates of eight cells. Each cell is an extruded triangular tube with a hollow center. Due to the triangular or delta shape of the ends, inner and outer generally strait edges 11 are provided. The Delta-8 bundle is formed from ceramic, but other materials may be used. In other embodiments, other Delta bundles (e.g., Delta-6) or other devices 10 than a Delta bundle are imaged.

Figure 2:
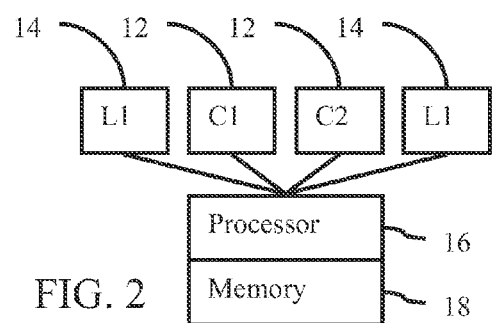
FIG. 2 is a block diagram of one embodiment of a system for active lighting for stereo reconstruction of edges.

One end of the bundle has open ends so that fuel rods may be inserted within the cells. The edges 11 define inner and outer diameters at the open ends of the bundle. Since the bundle is a three-dimensional structure, other edges extend away from the open end. The other ends may be closed, such as closing walls formed as part of the ceramic. The system of FIG. 2 is used to determine the layout or dimensions of the bundle at the open end for forming a seal. To form the seal, a map of the locations of the edges 11 is made.

A template or calibration marker may be attached or placed adjacent to the device 10. By positioning the template in a particular location, the device 10 to be imaged may be localized. Background information may be removed. The template may include blocks or distinguishing characteristics at known or measured distances, so may be used for calibration.

FIG. 2 is a block diagram of a system for active lighting for stereo reconstruction of the edges 11. The edges 11 are reconstructed in the system or as a map or drawing. The system includes one or more cameras 12, one or more lights 14, a processor 16, a memory 18, an analysis system 20, and a CNC machine 21. Additional, different, or fewer components may be provided. For example, the analysis system 20 is implemented by the processor 16. As another example, more or fewer cameras 12 and/or lights 14 are provided. In another example, the analysis system 20 and/or the CNC machine 21 are not provided.

The computer processing performed by the processor 16 may be implemented in various forms of hardware, software, firmware, special purpose processors, or a combination thereof. Some embodiments are implemented in software as a program tangibly embodied on a non-transitory program storage device. By implementing with a system or program, completely automated or semi-automated measurements, edge reconstruction, CAD drawing formation, or seal manufacture may be provided.

The processor 16 and/or memory 18 are part of a computer, personal computer, server, workstation, network processor, or other now know or later developed processing system. Various peripheral devices such as, for example, a display device, a disk storage device (e.g., a magnetic or optical disk storage device), a keyboard, a printing device, and a mouse, may be operatively coupled to the processor 16. A program may be uploaded to, and executed by, the processor 16 comprising any suitable architecture. Likewise, processing strategies may include multiprocessing, multitasking, parallel processing and the like. The processor 16 is implemented on a computer platform having hardware such as one or more central processing units (CPU), a random access memory (RAM), and input/output (I/O) interface(s). The computer platform also includes an operating system and microinstruction code. The various processes and functions described herein may be either part of the microinstruction code or part of the program (or combination thereof) which is executed via the operating system. Alternatively, the processor 16 is one or more processors in a network.

The instructions, user input (map confirmation or alteration), rules, and/or other information are stored in a non-transitory computer readable memory, such as the memory 18. The memory 18 is an external storage device, RAM, ROM, and/or a local memory (e.g., solid state drive or hard drive). The same or different computer readable media may be used for the instructions and other data. The memory 18 may be implemented using a database management system (DBMS) managed by the processor 16 and residing on a memory, such as a hard disk, RAM, or removable media. Alternatively, the memory 18 is internal to the processor 16 (e.g. cache). The memory 18 stores images, edge information, maps, CAD drawings, and/or rules.

The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system. Because some of the constituent system components and method steps depicted in the accompanying figures are preferably implemented in software, the actual connections between the system components (or the process steps) may differ depending upon the manner in which the present embodiments are programmed.

Figure 3:
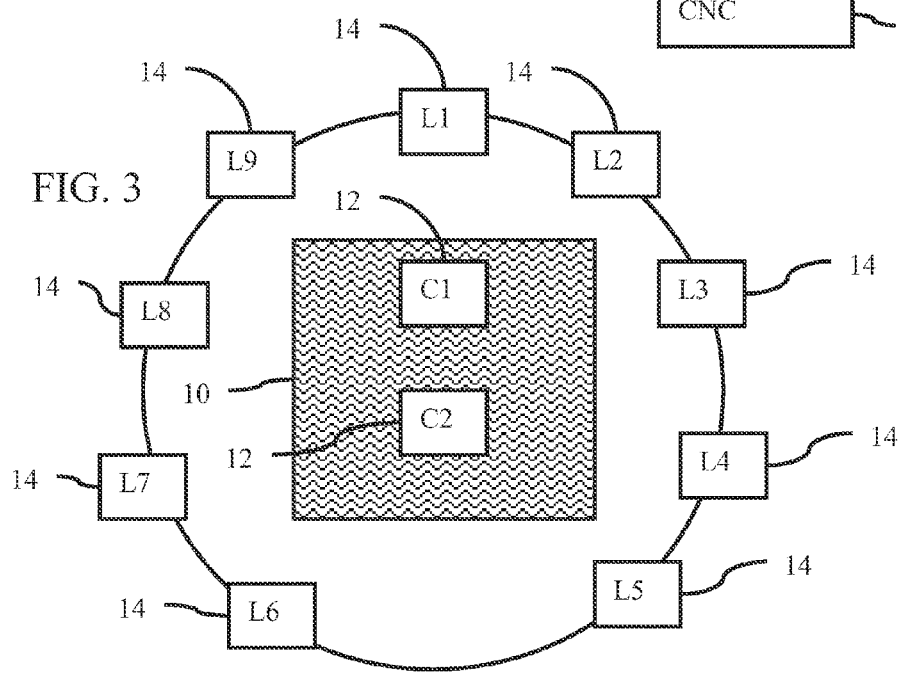
FIG. 3 is an end view of one embodiment of an arrangement of lights and cameras.

At least one light 14 is provided. FIG. 2 shows two lights, but only one light is provided in other embodiments. Using only one light, differences in lighting or illumination of the device 10 may be provided by having the light on or off. Ambient light or other light may cause different illumination when the light 14 is off. In the embodiment shown in FIG. 2, two lights are used. More than two lights may be provided. For example, FIG. 3 shows nine lights 14. In another example, at least five lights are provided.

The lights 14 are directed towards the device 10 to be imaged. The lights 14 are positioned on a frame, such as arms, board, or a ring. FIG. 3 shows the lights 14 positioned around a ring. In other embodiments, the lights 14 are positioned around a square or rectangular frame. Cross, X or other patterns of lights 14 may be used.

A distribution of the lights 14 may be used, such as generally equally spaced around the cameras 12. In one embodiment, the lights 14 are positioned around the cameras 12, but may be positioned between, against, or on the cameras 12. FIG. 3 shows the lights positioned around the cameras 14 with generally equal spacing other than a larger gap at a bottom of the ring. Other variations in spacing may be used.

The lights 14 may be at the same or different distances to the device 10 or a point on the device 10 to be illuminated. Any arrangement in three-dimensions of the lights 14 in the array may be used. In the example of FIG. 3, the lights 14 are positioned at a radius of about 20 cm one a plane positioned orthogonally to the device 10 and about 1 m away from the device 10. Other positions to obtain different angles of lighting incidence to the device 10 may be used.

The lights 14 and cameras 12 are fixed relative to each other. By mounting on a same frame, the lights 14 and cameras 12 are maintained at the same relative positions with respect to each other. In alternative embodiments, one, some, or all of the lights 14 may be repositioned. For example, one light 14 may be provided. For capturing images at different times, the light 14 is shifted to different positions. A robotic arm or track system is used to reposition the light 14. A fewer number of lights 14 may be used to provide illumination from a greater number of directions.

The lights 14 and cameras 12 are stationary relative to the device 10 to be imaged. For example, the device 10 is positioned on a frame, bed, or platform connected with the frame holding the lights and cameras 12. During image capture, the lights 14, cameras 12, and device 10 are held stationary. In between, before, or after capturing images, the lights 14, cameras 12, and/or device 10 may be moved. Alternatively, the lights 14 and cameras 12 are not repositionable. In another example, the framework for the lights 14 and cameras 12 is connected with a building, floor, or other structural support. The device 10 is positioned on the floor or other structural support different than the framework for the lights 14 and/or cameras 12.

The lights 14 are light emitting diodes. Each light 14 is a single light emitting diode, but may be formed from an array or two or more light sources. Other types of lights may be used, such as fluorescent, halogen, or incandescent. Any frequency of light may be used, such as lights producing white light.

The lights 14 are active. The intensity of the lights 14 may be changed. For example, the lights 14 may be turned on and off. As another example, the lights 14 may be set for various outputs, such as different amounts of lumens. Other characteristics of the lights 14 may be adjustable instead of or in addition to the intensity, such as changing the frequency (i.e., color) of the lighting.

The lighting helps to better identify the boundaries of the open end so that structural edges 11 are localized. The lights 14 change the characteristic of the illumination of the device 10. Intensity, frequency, and/or direction of illumination are changed. In one embodiment, the illumination is changed to be from different directions relative to the device 10 at different times. The lights 14 are configured to turn on and off in sequence to illuminate the device 10 from the different directions at different times. For example, a first light 14 turns on to illuminate the device 10, then the first light 14 turns off and a second light 14 turns on, and so on (i.e., one by one). In other embodiments, combinations of lights 14 turn on and off in sequence. For example, lights L1, L2, and L3 turn on then off, then lights L3, L4, and L5 turn on then off. Overlapping combinations and/or exclusive combinations of lights may be used. The sequence may be for any change in illumination characteristic other than or in addition to turning on and off.

Due to the different positions of the lights 14 relative to the device 10 having the edges 11 to be illuminated, the sequence causes different illumination of the device 10. Different shadows and different brighter edges 11 occur for different directions or types of illumination. The illumination of the device 10 is different at different times.

Any timing may be used, such as changing the illumination every second. The sequence may proceed more rapidly where the operation of the cameras 12 allows. Less rapid sequencing may be provided.

There is at least one camera 12. FIGS. 2 and 3 show use of two cameras 12. More than two cameras may be provided. While "stereo" is typically associated with dual, "stereo" reconstruction as used herein may be performed from two or more view points.

Figure 4:
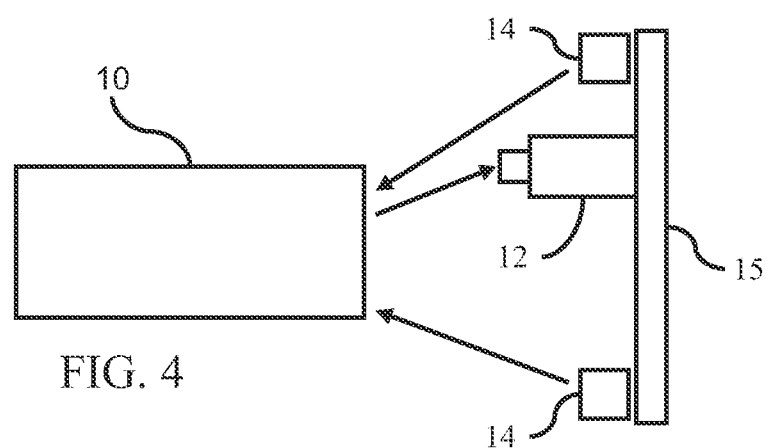
FIG. 4 is a side view of one embodiment of a system for active lighting and stereo capture.

FIG. 4 shows an example embodiment for stereo viewing with one camera 12. The camera 12, with or without the lights 14, moves between capturing images. By positioning the one camera 12 in different locations without changing the location of the device 10 being imaged, stereo images may be acquired. The camera 12 is positioned on a robot or track for moving to different positions. The robot or track includes sensors for positioning of the camera 12 with the desired precision. Alternatively, calibration or targets on or adjacent to the device 10 are used to determine the relative position of the camera 12 at different times.

Figure 5:
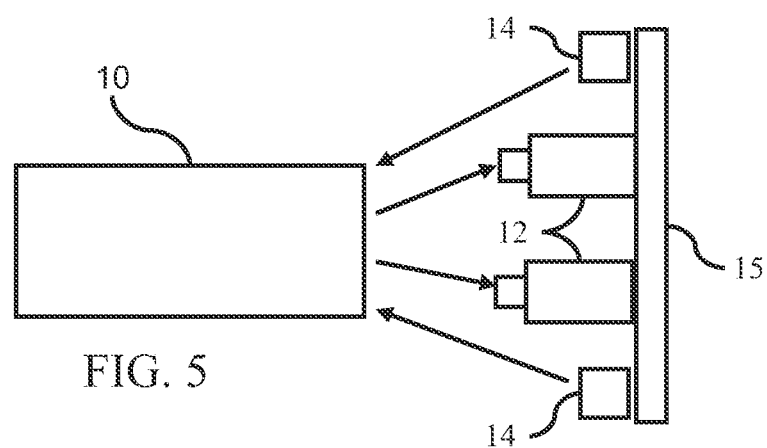
FIG. 5 is a side view of an alternative embodiment of a system for active lighting and stereo capture.

In the example embodiment of FIG. 5, two cameras 12 are provided. The cameras 12 are fixed relative to each other and the device 10 during image capture. Alternatively, one or both of the cameras 12 may be moveable relative to each other and/or the device 10. The cameras 12 may move along any axis or at any angle. Rotational movement may be provided.

The cameras 12 are mounted to a same frame, such as a beam. Alternatively, the cameras 12 are mounted to separate frames. The cameras 12 are directed at the end of the device 10.

The cameras 12 comprise CCD or other imaging devices 10. Passive imaging devices 10 are used. In one embodiment, the cameras 12 each have at least 10 Mpixels for capturing images. Any focus may be used. In one embodiment, the cameras 12 have or can be changed to have a narrow focus encompassing just or only a little bit more (e.g., 5-20 cm) than the end of the device 10 being imaged. The cameras 12 may not include independent lighting, but alternatively may have lights 14 built into, positioned against, or on them.

Through movement or through multiple cameras 12, images from at least two different view points are acquired. The edges 11 are viewed from different directions. Different view points are provided by imaging the device 10 from different directions. In the example of FIG. 3, the cameras 12 are offset vertically from each other. Horizontal or other angles may be used. The cameras 12 are a same distance to the device 10, but may be at different distances. Any amount of offset may be used, such as about 10 cm.

The cameras 12 may be internally calibrated. The internal optics, such as the focal length, lens distortion, number of elements (pixels), or other characteristic are measured or known. The geometry of the internal components of the cameras 12 are normalized or accounted for to allow measurement with images.

The cameras 12 may be externally calibrated. The calibration locates the cameras 12 relative to each other or other world coordinates. The depth from the device 10, angle of viewing, and/or point in space of the cameras 12 are measured. The cameras 12 are calibrated relative to each other (camera1 to camera2 or camera2 to camera1) or relative to world space. Any calibration may be used, such as using a calibration template with known parameters (e.g., rectangles with different sizes). The known template may be used to determine the distance from the camera 12 to the template and the angle of viewing, providing three-dimensional coordinates of the camera 12.

To produce a map of the open ends of the device 10 (e.g., Delta-8 bundle) using edge-based stereo reconstruction, images of the device 10 with different illumination are taken. For each view of the stereo views, an image is captured with the illumination in a given state. The illumination changes, and then another image is captured from each view point. More than one image maybe acquired for a given view point and illumination combination. For each view point, images are taken at different times corresponding to different illumination.

The processor 16 is configured to receive the images. The processor 16 controls the lights 14 and the cameras 12 to acquire the images for each view point in sequence with changes in illumination. The images may be acquired for the different views at a same time. Alternatively, the images may be acquired for the different views at different times, such as sequencing through the different illuminations and capturing images from one view and then sequencing through the different illuminations and capturing the images for another view.

The cameras 12 transmit the images to the processor 16. Alternatively, the processor 16 reads the images from a memory, such as a memory of the cameras 12 or a memory to which the images have been stored by the cameras 12.

Figure 6:
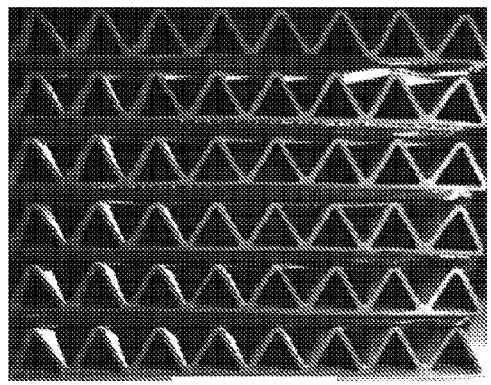
FIG. 6 is an example image of a Delta-8 bundle.
Figure 7:
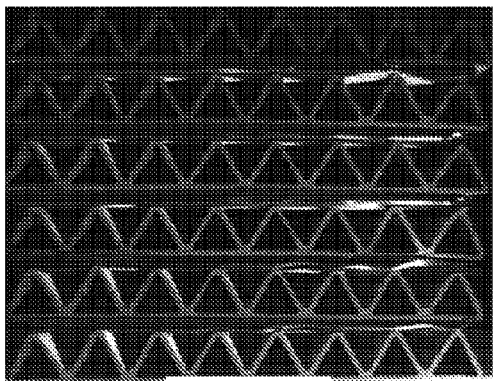
FIG. 7 is another example image of the Delta-8 bundle of FIG. 6.

The images are of the edges 11 taken from different directions. For each direction, the images are of the edges 11 under different illumination. For example, the different illumination is provided by lights 14 at a same intensity but different directions. Different intensities may be used, such as to provide better contrast. As a result, the images for each view point have different shadows but the edges 11 are substantially the same. FIG. 6 shows one image of a Delta-8 bundle illuminated from a light directed at the open ends, but spaced below a top tier and to the right of the bundle (e.g., in reference to FIG. 3, at the 1 o'clock position). FIG. 7 shows one image of the same Delta-8 bundle illuminated from a light directed at the open ends, but spaced below and to the right the other light (e.g., in reference to FIG. 3, at the 3 o'clock position).

The processor 16 is configured to perform edge detection on each or a subset of the images. The edge detection highlights and/or segments the edges in each image. Any edge detection may be used, such as converting the image to spatial gradients and applying a threshold. Directional filtering may be used. The directional filtering may be limited to particular directions. In one embodiment, a canny edge detection algorithm is used. In the embodiment of FIG. 3, nine images corresponding to sequential illumination by the nine lights 14 are acquired for each view point, and edge detection is performed on all nine images.

The processor 16 is configured to combine the images from each of the at least two different view points. The images for one view point but different illumination are combined together. The images for another view point but different illumination are combined together. The images responsive to different illumination are combined. More than one image may be provided for a same illumination and view point.

The images are combined after edge detection. The edges may be extracted as part of the edge detection so that the images being combined are of just the edges 11. Alternatively, the edge detection highlights the edges 11 relative to other data and the images with the highlighted edges 11 are combined.

The images are aligned using the calibration template, correlation, or reliance on the device 10 and the camera 12 for the images being in the same location with the same focus. Alignment may use image processing or may be assumed (i.e., the same pixel in each image treated as the same location in all the images from that view point).

Any combination may be used. For example, a statistical combination is provided. A mean, median, or other statistical value may be used. The combination reduces the influence of edges not common to all the images being combined, such as due to shadow. The combination enhances or maintains the common edges 11, such as the edges 11 of the device 10. The output of the edge detection results from statistical analysis to retain only or mostly the true structural edges 11 that belong to the open end of the Delta bundle or other device 10. The output may be an image based on intensities of the component images or may be a map of edge locations (e.g., a binary image).

Further processing may be performed. A threshold, high pass filtering, gradient calculation, further edge detection, or other process may further enhance the structural edges 11 in the combined image.

Figure 8:
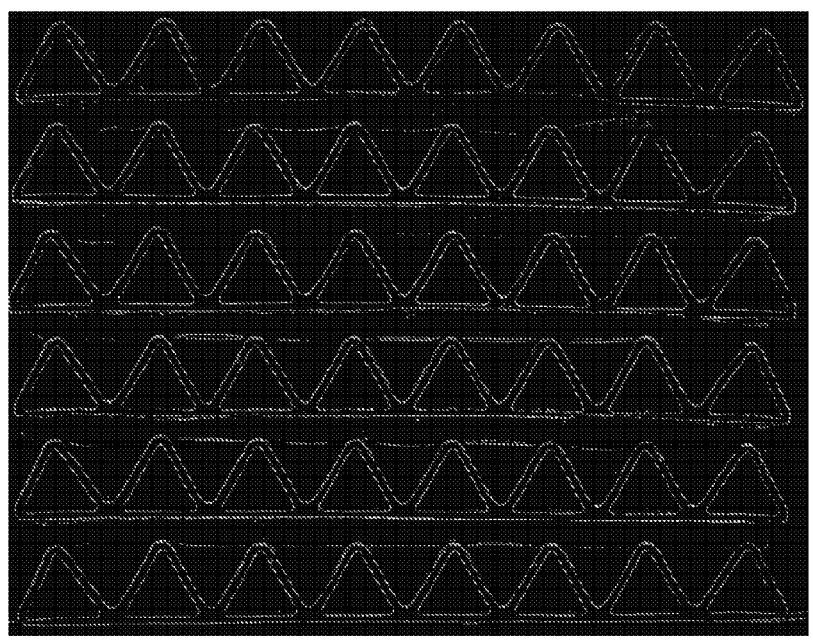
FIG. 8 is an edge processed image formed by combination of other such images, including the images of FIGS. 6 and 7.

FIG. 8 shows an edge image after combination. Non-structural edges (e.g. texture edges) have been eliminated or reduced as compared to the component images shown in FIGS. 6 and 7. The active lighting creates shadows or non-structural edges in the image. The result of combination allows for stereo reconstruction algorithm with fewer ambiguities.

The processor 16 is configured to generate a stereo reconstruction of the edges 11 of the device 10 from the combined images. A combined image is provided for each of the different view points. Since the images are from different view points, stereo reconstruction may be used to determine geometric measurements. The stereo reconstruction is of the combined, detected edges from the two or more different directions or view points.

Any stereo reconstruction may be used. In one embodiment, an edge-based stereo reconstruction algorithm is used to recover the map of the open ends of the bundle or device 10.

The stereo reconstruction may use a nominal model. The model is scaled to the images, such as being sized based on the internal and external calibration. The model is of the expected shape of the edges. By fitting the model to the stereo views, remaining non-structural edges or structural edges not needed may be removed or reduced. The model may encode other information, such as air and fuel rod holes to be included in the seal and relative to the edges 11.

3D pose estimation of the nominal model is performed. The processor 16 aligns the model with the stereo view. Any alignment may be used. The alignment is rigid. The best fit is identified. For example, an iterative closest point process is used to find a best position of the nominal model to the edges of the stereo view.

The processor 16 generates a plurality of candidate matches between the aligned model and the stereo view. While aligned, the model and the stereo view edges 11 may be different. The open end may deviate from the average or nominal model.

Figure 11:
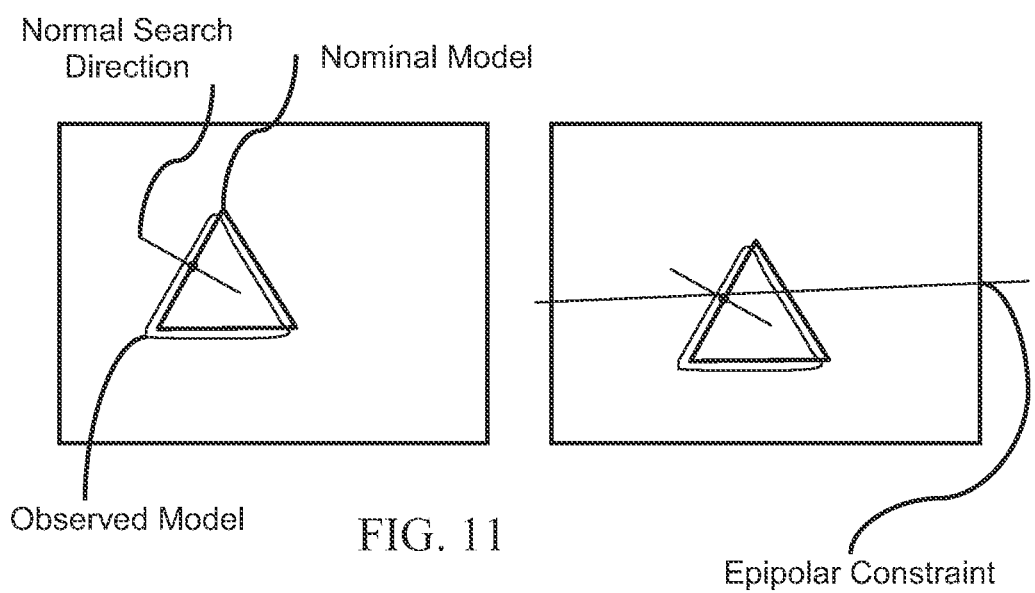
FIG. 11 illustrates one embodiment of a search approach for matching a model to edges.

Candidate matches may be generated by any method. In a first method, the algorithm searches along normal directions of projected nominal model points (see FIG. 11, left side). The search is along normal lines to the edges of the nominal model. In a second method, the search is limited by epipolar constraints. Epipolar constraints define all the possible locations of a point in the left image as a line in the right image (see FIG. 11, right side). A point in a left image projects to a line of possible points in the right image and vice versa. Other processes for generating candidates may be used, such as matching line segments across the two images or using gradient histograms for matching points. Feature-based matching algorithms may be applied.

The processor 16 performs the stereo match. The stereo views are selected from the candidates. Any selection criteria may be used. For example, the candidates are selected as a function of a minimum error for continuity. By minimizing the error of reconstructed (contour) points for continuity, the correct matches are identified. The error of the points is minimized for both position and normal (i.e., first order derivative). Other cost functions for minimization may be used.

With correct stereo matches, the reconstruction is performed. For example, linear triangulation recovers the corresponding 3D points. The exterior of the open ends of the Delta-6 bundle or device 10 is captured. The exterior is captured as a two or three-dimensional map.

Figure 9:
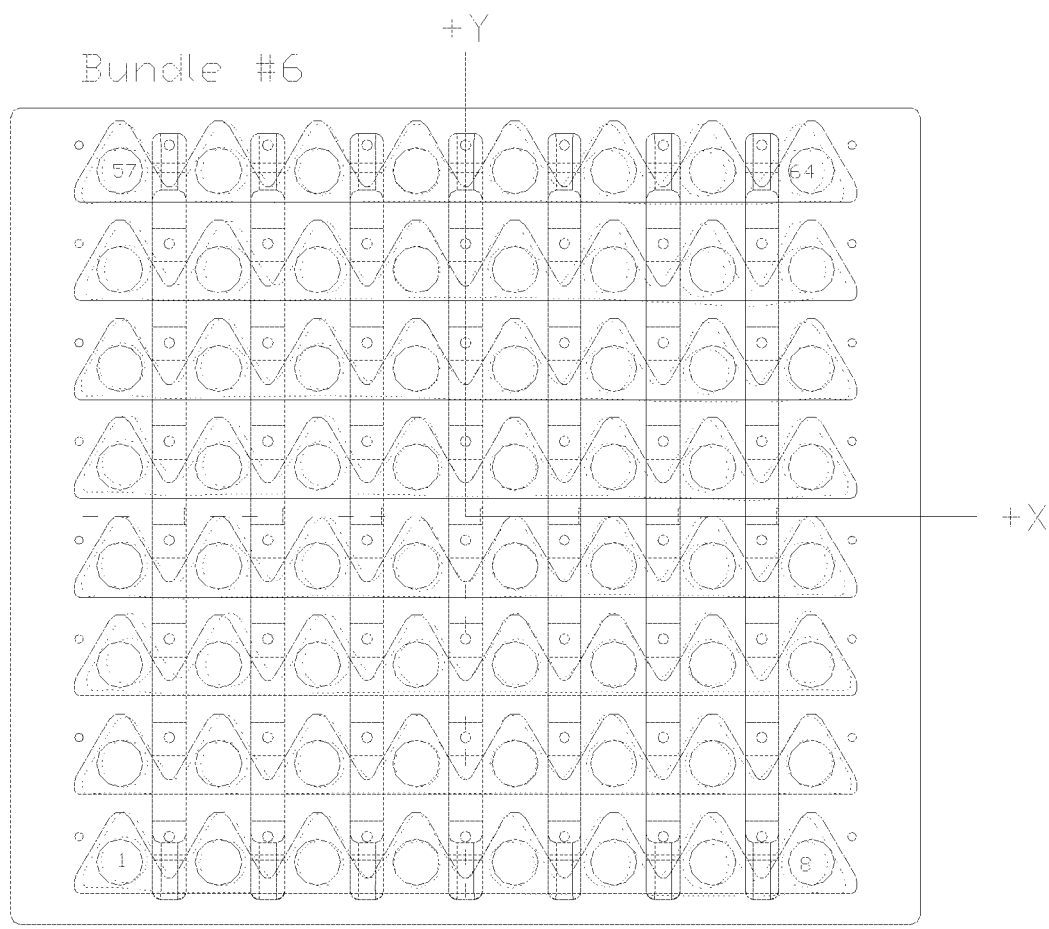
FIG. 9 is an end view illustration of an edge model overlaid with detected edges.

FIG. 9 shows the nominal model before reconstruction and the nominal model after reconstruction. The edges 11 in the reconstruction are of the model, but shifted to match the edges of the actual device 10. The squares and circles are holes and tolerances encoded in the model for use in the seal.

This map may be used by a CNC machine 21 to manufacture the seal for this bundle. The data analysis system 20 of FIG. 2 may perform further processing, such as comparison with any other models. For example, an image corresponding to FIG. 9 is displayed to the user for verification and/or correction.

Figure 10:
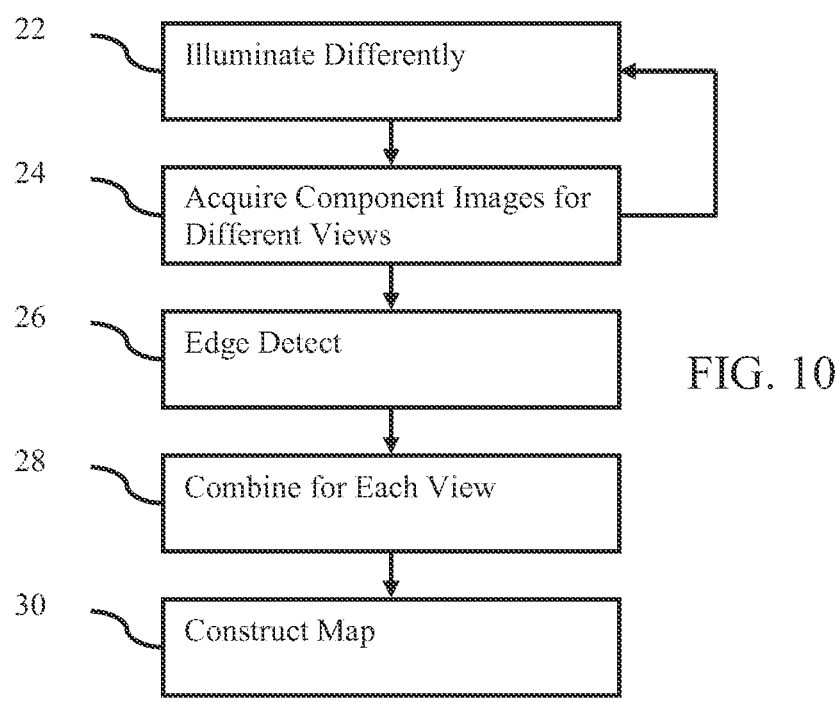
FIG. 10 is a flow chart diagram of one embodiment of a method for active lighting for stereo reconstruction of edges.

FIG. 10 shows a method for active lighting for stereo reconstruction of edges. The method is implemented by the system of FIG. 2, FIG. 3, FIG. 4, FIG. 5, and/or a different system. The method is provided in the order shown, but other orders may be provided. For example, act 26 is performed after the combination of act 28. Additional, different or fewer acts may be provided.

The active lighting and stereo reconstruction is implemented with or without calibration and/or other positioning processes specific to each given device 10 to be imaged. A portable marker template may be positioned on or adjacent to the target object to locate the target object. The marker template may be used where one, more or all of the cameras are located on a robotic arm. The marker template is used for initial camera and X-Z linear position calibration, where X is the width or horizontal, Y is the vertical or height dimension, and Z is range along the device (i.e., away from the camera with positive direction being from the open end to the closed end). One or more marker templates are positioned within the field of view of the cameras in a region close to the device 10 to be imaged or where the device 10 to be imaged will be located. A robotic arm moves the template markers in a world coordinate system while imaged by the camera or cameras. The camera or cameras are moved to preset locations. Other calibration or device identification approaches may be used.

The cameras and any camera positioning device 10 are calibrated automatically. Internal and external calibration is provided for the camera or cameras. The camera positioning device 10 is calibrated to establish the coordinate system. The calibration occurs in response to user activation. The calibration process may be performed automatically or without further user input (e.g., without user measurement). The calibration is performed once after construction of the system. The calibration may or may not be updated, such as updating before each device 10 is measured or periodically (e.g., weekly or monthly). Other types and processes of calibration may be used.

Once calibration is performed, the method for active lighting in stereo reconstruction is performed. Given the target object to be measured (e.g., D-8 Bundles), the acquisition system collects a set of images of the bundles' open ends. For stereo reconstruction, two or more edge images from a respective two or more view points are generated. The edge image is an image of edges. For example, an edge image may be an image captured of the device 10 and not further processed to locate or enhance edges. As another example, the edge image is an image of the device 10 that has been filtered or had other edge detection performed. In yet another example, the edge image is an image of the edges extracted or segmented from other information in an image of the device 10.

Each edge image from each of the view points is formed from a plurality of component images. The component images are captured with different lighting. In act 22, the target object is illuminated. One or more lights are turned on, off, or otherwise changed (e.g., frequency or color) to illuminate the target object in a particular way. For example, a single light is turned on and all other lights are turned off.

The loop back from act 24 is for performing a sequence of illuminations. In repetitions of act 22, the illumination is different. The lighting is changed. For example, one light is turned off and another light is turned on. Where the lights are in different positions relative to the target object, the illumination is different. Where the lights have different characteristics (e.g., intensity or frequency), the illumination is different regardless of position.

Some lighting may be constant, such as one or more lights always being on. Some ambient light from the facility housing the imaging system and/or from windows may illuminate, in part, the target object. In other embodiments, the cameras, target object, and active lighting are placed in a room with no or little other lighting. A cover or shield may be provided to reduce ambient light.

In act 24, component images are acquired. One or more cameras are activated to capture an image. Images of the target object are captured from different views at a same time or different times. The target object is imaged from different directions for a stereo view.

Act 24 is part of the active lighting repetition loop with act 22. One or more component images are acquired for one, more, or all the different views while the target object is illuminated in one way. For example, a light is activated in act 22. In act 24, two cameras capture the target object as illuminated by the light. The capture occurs at a same time. The target object is then illuminated differently in a repetition of act 22. The two cameras capture the target object while illuminated in this different way in the repetition of act 24, and so on. Pairs of component images are acquired at a same time with the edges subjected to a same lighting. Different pairs correspond to different lighting of the edges. As another example, an image of the target object is captured from only one or fewer than all of the points of view for each repetition. After repeating acts 22 and 24 to capture component images from the full sequence of lighting, the repetition of acts 22 and 24 is repeated again to capture images from a different point of view. The camera may be moved to a different position for the other repetitions of acts 22 and 24.

After cycling through the repetitions of acts 22 and 24, component images for different view points or different directions relative to the edges are acquired. For each of the different directions, two or more images are acquired while the edges are illuminated differently. For example, three component images, I, are acquired for a first viewing direction (C1 for camera position 1) of the target object—C1I1, C1I2, C1I3. Three component images, I, are acquired for a second viewing direction (C2 for camera position 2) of the target object—C2I1, C2I2, C2I3.

In act 26, edge detection is performed on each of the component images. The detection is by specifically identifying edges or by enhancing edges relative to other structures without identifying particular locations as belonging to edges. In other embodiments, edge detection is not performed or is performed after combination in act 28.

In act 28, the component images are combined. The component images to be combined are from a same view point. For example, C2I1, C2I2, C2I3 are combined to a single image, C2I, and C1I1, C1I2, C1I3 are combined to a single image C1I.

The images to be combined are the output of the edge detection of act 26. The edge enhanced images are combined. Alternatively, the information from specifically identified edge locations is combined and information from other locations is not combined.

The combination is statistical. An average, weighted average, median, or other statistical combination is performed. The combination reduces data from shadow or textual (non-structural) edges while maintaining data from actual edges. Since the component images are associated with different illumination, the actual edges are in a same position in each image and shadow or non-structural edges are in different positions. If a sufficient number of component images indicate an edge in a given location, the information from that location or the location itself is maintained in the combination image. If a fewer number of component images indicate an edge in a given location, the information from that location or the location itself is not included in the combination image.

The result of the combination is substantially an image of structural or actual edges. Some noise or shadow information may be included. The combination image may be binary, such as one value for edge locations and another value for non-edge locations. Alternatively, the combination image includes pixels modulated to a range of values.

The combination provides a single edge image for each of the views of the target object. In act 30, a map is constructed of the edges. A processor performs a stereo reconstruction. The stereo reconstruction provides geometric measurements, based on the calibration, for the edges. The map is two or three-dimensional. By combining edge images from different views, the stereo construction of the map may be performed.

Any stereo reconstruction may be used. In one embodiment, any miss-detected edges remaining after combination are removed as part of the stereo reconstruction. The reconstruction uses a nominal model having edges desired and not other edges, even if structural. Since the general configuration of the edges of the target object is known, the nominal model representing the general configuration is used in the stereo reconstruction. The combined images are used to adjust the model so that the output stereo reconstruction is the model adjusted for the actual target object.

In one embodiment, a pose of the nominal model of the edges is estimated. The nominal model is rigidly fit to the combined edge images. Candidate stereo matches are calculated based on the estimated pose. Normals to all or some of the edges of the nominal are projected. These normal projections may be constrained by the stereo nature, such as a point in one image corresponding to a line of possible points in another image and vice versa (i.e., epipolar constraint between two camera positions). Candidate stereo matches are the possible matches of the stereo combination edge images to the normal projections. Where the normal projections intersect the edges of the combination edge images, a candidate is identified. The error between the candidate locations and the combined image edges is calculated. The candidate with the least error is selected as the stereo match. With the stereo match, linear triangulation recovers the three-dimensional or geometric points for the stereo view.

The calibrated images from the camera positions are processed for feature extraction. This feature extraction may benefit from use of expected templates (i.e., nominal model), increasing speed and robustness. The extracted features are triangulated using the known camera locations provided by the calibration. The result is a set of poly-lines outlining the cell outside and/or inside boundaries.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system for constructing a custom bundle seal using active lighting for stereo reconstruction of edges, the system comprising:
    a plurality of lights positioned to illuminate the edges differently at different times;
    at least two cameras positioned to view the edges from different directions;
    a processor configured to receive images from a first of the different directions, different images from the first direction being of the edges illuminated differently by the lights, configured to receive images from a second of the different directions, different images from the second direction being of the edges illuminated differently by the lights, and configured to generate the stereo reconstruction of the edges as a function of the images from the first and second different directions; and
    a machining device configured to manufacture a custom bundle seal corresponding to the stereo reconstruction of the edges.

2. The system of claim 1 wherein the processor is configured to detect edges in each of the images from the first and second different directions and configured to combine the detected edges from the first direction and combine the detected edges from the second direction, the combinations reducing shadows while maintaining or increasing the detected edges relative to the detected edges, the stereo reconstruction being of the combined, detected edges from the first and second directions.

3. The system of claim 1 wherein the plurality of lights are positioned around the cameras, the lights and cameras being fixed in position relative to each other.

4. The system of claim 1 wherein the edges are on an open end of a fuel cell delta-8 bundle.

5. A system for constructing a custom bundle seal using active lighting for stereo reconstruction of edges, the system comprising:
- at least one light configured to illuminate a device having the edges, the illumination being from at least two different directions relative to the device;
- at least one camera configured, through movement or through multiple of the at least one camera, to acquire images from at least two different view points, different images for each of the different view points being of the edges while illuminated differently by the at least one light;
- a processor configured to:
  - combine the images from each of the at least two different view points, the images being combined for each view point being responsive to the different illuminations so that the combination for the view point has reduced shadow information while maintaining or enhancing the edges relative to the images being combined, and
  - generate a stereo reconstruction of the edges of the device from the combined images for the at least two different view points; and
- a machining device configured to manufacture a custom bundle seal corresponding to the stereo reconstruction of the edges.

6. The system of claim 5 wherein the at least one camera comprises two or more cameras and the at least one light comprises two more lights.

7. The system of claim 6 wherein the cameras and the lights are stationary relative to each other and the device for acquiring the images.

8. The system of claim 5 wherein the at least one light comprises at least five lights spaced from and around the at least one camera.

9. The system of claim 5 wherein the at least one light is configured to turn on and off in sequence to illuminate the device from the different directions at different times, the images for each of the points of view comprising images from the different times.

10. The system of claim 5 wherein the device comprises a delta-8 bundle having open ends, the edges being on the open ends.

11. The system of claim 5 wherein the at least one light comprises a light emitting diode.

12. The system of claim 5 wherein the processor is configured to perform edge detection on the images and configured to statistically combine the images of each of the different view points.

13. The system of claim 5 wherein the processor is configured to generate the stereo reconstruction as a function of a nominal model of the device and an epipolar constraint and normal directions to the edges.

14. The system of claim 5 wherein the processor is configured to generate the stereo reconstruction as a function of a minimum error for continuity.

15. A method of constructing a custom bundle seal using active lighting for stereo reconstruction of edges, the method comprising:
- generating a first edge image from a first plurality of first component images, different first component images corresponding to different lighting, the first edge image having reduced shadow information relative to the first component images by combination of the first component images;
- generating a second edge image from a second plurality of second component images, different second component images corresponding to the different lighting, the second edge image having reduced shadow information relative to the second component images by combination of the second component images the first component images being from a different direction to the edges than the second component images;
- constructing, with a processor, a map of the edges from the first and second edge images; and
- manufacturing, with a machining device, a custom bundle seal corresponding to the map of the edges.

16. The method of claim 15 wherein generating the first and second edge images comprises acquiring the first and second component images with stereo cameras, pairs of the first and second component images acquired at a same time with the edges subjected to a same lighting direction, different pairs corresponding to different lighting directions to the edges.

17. The method of claim 15 wherein generating the first and second edge images comprise statistically combining the first component images and statistically combining the second component images, respectively.

18. The method of claim 15 wherein constructing comprises stereoscopically reconstructing a three-dimensional map of the edges.

19. The method of claim 18 wherein stereoscopically reconstructing comprises estimating a pose of a nominal model of the edges, generating candidate stereo matches, selecting one of the candidate stereo matches, and linear triangulating from the selected one of the candidate stereo matches.

20. The method of claim 15 wherein generating the first and second edge images comprise generating stereo views of delta-8 ceramic structure.

21. The method of claim 15 wherein generating the first and second edge images comprises performing edge detection on each of the first and second component images.

* * * * *